(12) United States Patent
Takata et al.

(10) Patent No.: US 10,301,547 B2
(45) Date of Patent: May 28, 2019

(54) FLAME RETARDANT COMPOSITION, FLAME RETARDANT FIBER TREATED WITH FLAME RETARDANT COMPOSITION, AND METHOD FOR INCREASING AMOUNT OF FLAME RETARDANT COMPONENT ADHERED ONTO FIBERS USING SAID COMPOSITION

(71) Applicant: ADEKA CORPORATION, Tokyo (JP)

(72) Inventors: Masahiro Takata, Tokyo (JP); Go Homma, Tokyo (JP); Hiroaki Shirai, Tokyo (JP); Masaki Hosaka, Tokyo (JP)

(73) Assignee: ADEKA CORPORATION, Tokyo (JP)

( * ) Notice: Subject to any disclaimer, the term of this patent is extended or adjusted under 35 U.S.C. 154(b) by 505 days.

(21) Appl. No.: 14/779,667

(22) PCT Filed: Mar. 28, 2014

(86) PCT No.: PCT/JP2014/059256
§ 371 (c)(1),
(2) Date: Sep. 24, 2015

(87) PCT Pub. No.: WO2014/163013
PCT Pub. Date: Oct. 9, 2014

(65) Prior Publication Data
US 2016/0053179 A1    Feb. 25, 2016

(30) Foreign Application Priority Data
Apr. 1, 2013    (JP) .................. 2013-076032

(51) Int. Cl.
*C09K 21/12*    (2006.01)
*C09K 21/14*    (2006.01)
(Continued)

(52) U.S. Cl.
CPC .............. *C09K 21/12* (2013.01); *C09K 21/14* (2013.01); *D06M 13/285* (2013.01);
(Continued)

(58) Field of Classification Search
CPC ............................ D06M 11/71; D06M 13/292
See application file for complete search history.

(56) References Cited

U.S. PATENT DOCUMENTS 2,935,471 A * 5/1960 Aarons .................. D06M 11/56
    106/18.11
4,405,761 A * 9/1983 Rodgers ............... C08K 5/0008
    252/609

(Continued)

FOREIGN PATENT DOCUMENTS

CN    102057102    5/2011
CN    102292388    12/2011
(Continued)

OTHER PUBLICATIONS

Wikipedia, nonyl phenoxypolyethoxylethanol MSDS, 2011.*

*Primary Examiner* — Gregory R Delcotto
*Assistant Examiner* — Preeti Kumar
(74) *Attorney, Agent, or Firm* — Wenderoth, Lind & Ponack, L.L.P.

(57) ABSTRACT

The present invention relates to a flame retardant composition, including: at least one phosphorus compound represented by the following general formula (1) or (2); a cationic surfactant; and a nonionic surfactant:

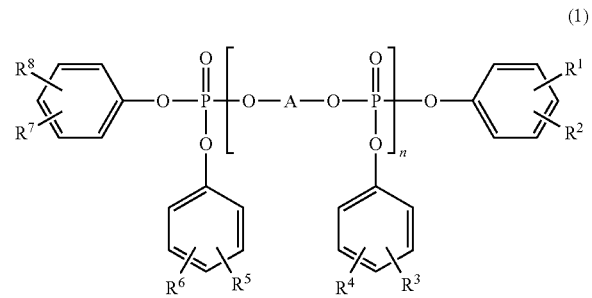

(1)

in the formula (1), A represents a divalent hydrocarbon group having 1 to 20 carbon atoms, n represents a number of from 1 to 10, and $R^1$ to $R^8$ each independently represent a hydrogen atom or an alkyl group having 1 to 20 carbon atoms;

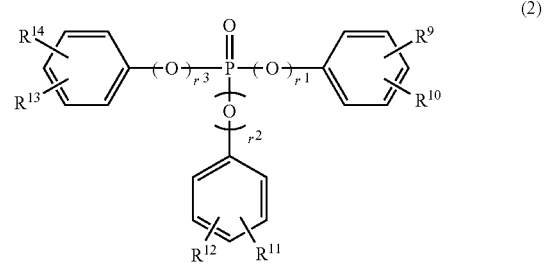

(2)

in the formula (2), $R^9$ to $R^{14}$ each independently represent a hydrogen atom or an alkyl group having 1 to 20 carbon atoms, and $r^1$, $r^2$, and $r^3$ each independently represent a number of 1 or 0.

9 Claims, 1 Drawing Sheet

(51) Int. Cl.
*D06M 15/53* (2006.01)
*D06M 13/285* (2006.01)
*D06M 13/288* (2006.01)
*D06M 13/292* (2006.01)
*D06M 13/295* (2006.01)
*D06M 13/313* (2006.01)
*D06M 13/325* (2006.01)
*D06M 13/463* (2006.01)

(52) U.S. Cl.
CPC ........ *D06M 13/288* (2013.01); *D06M 13/292* (2013.01); *D06M 13/295* (2013.01); *D06M 13/313* (2013.01); *D06M 13/325* (2013.01); *D06M 13/463* (2013.01); *D06M 15/53* (2013.01); *D06M 2200/30* (2013.01)

(56) References Cited

U.S. PATENT DOCUMENTS

| | | |
|---|---|---|
| 2011/0114904 A1 | 5/2011 | Dermeik et al. |
| 2012/0010336 A1 | 1/2012 | Levchik et al. |

FOREIGN PATENT DOCUMENTS

| | | |
|---|---|---|
| EP | 0 476 644 | 3/1992 |
| JP | 2008-24890 | 2/2008 |
| JP | 2011-523984 | 8/2011 |
| JP | 2012-515832 | 7/2012 |
| TW | 200813290 | 3/2008 |

* cited by examiner

| | Ex. 1 | Ex. 2 | Ex. 3 | Ex. 4 | Ex. 5 | Ex. 6 | Ex. 7 | Ex. 8 | Ex. 9 | Ex. 10 | Ex. 11 | Comp. Ex. 1 | Comp. Ex. 2 |
|---|---|---|---|---|---|---|---|---|---|---|---|---|---|
| Ratio of adhesion of phosphorus compound onto test cloth (%) | 95 | 98 | 94 | 97 | 78 | 98 | 73 | 95 | 93 | 94 | 97 | 5.4 | 6 |
| Ratio of adhesion of flame retardant composition onto test cloth (%) | 76 | 80 | 75 | 78 | 65 | 81 | 60 | 75 | 74 | 74 | 80 | 4.8 | 5.5 |
| Appearance of liquid before treatment | 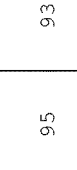 | 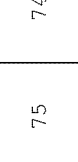 | 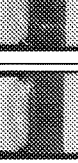 | 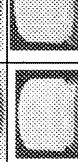 |  |  |  | 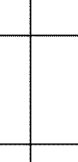 |  | 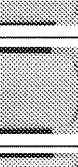 |  |  |  |
| Appearance of liquid after treatment | 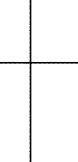 |  | 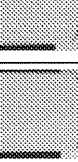 | 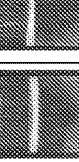 |  |  |  |  |  |  |  |  |  |

FLAME RETARDANT COMPOSITION, FLAME RETARDANT FIBER TREATED WITH FLAME RETARDANT COMPOSITION, AND METHOD FOR INCREASING AMOUNT OF FLAME RETARDANT COMPONENT ADHERED ONTO FIBERS USING SAID COMPOSITION

TECHNICAL FIELD

The present invention relates to a flame retardant composition containing a phosphorus compound, a cationic surfactant, and a nonionic surfactant, a flame retardant fiber treated with the flame retardant composition, and to a method of increasing an amount of a flame retardant component adhered onto fibers using the composition.

BACKGROUND ART

A flame retardant is a chemical to be added to a combustible material to make the material hard to burn or to prevent the spread of flames on the material, and has been used in all sorts of materials such as building materials, curtains, rugs, various members for vehicles (such as seat cloth), rubber, plastic, paper, and packaging material. In particular, a technology involving imparting a flame retardant effect to a fiber finds use in a wide variety of applications, and examples thereof include: the use of the flame retardant in textile goods (such as curtains, carpets, and rugs) for places where unspecified number of people gather typified by, for example, theaters, hotels, and high-rise buildings specified in disaster prevention regulations; and the use of the flame retardant in, for example, bedding, baby clothes, clothes for seniors, and the cloth of vehicle seats. Accordingly, there is an extremely high need for a flame retardant for fibers, and hence investigations have heretofore been conducted on flame retardants by many enterprises and organizations.

For example, a flame retardant is generally used in polyester fibers that are produced in large amounts and are frequently used as material for the seat members of vehicles or for curtains, and an alicyclic halogen compound (such as hexabromocyclododecane (HBCD)) has heretofore been a mainstream flame retardant. The compound brings together excellent flame retardant effects and durability. However, polyester fibers processed by using the compound are known to generate gases harmful to humans when it combusts, and hence concern has been raised in that its harmfulness to the natural environment is extremely high. In view of the foregoing, various kinds of flame retardant components that replace the halogen compound have been studied, and it has heretofore been found that a phosphorus compounds show good flame retardancy (Patent Literature 1).

A flame retarding method for a polyester fiber in the case where HBCD is used as a flame retardant has involved adhering a flame retardant component to the inside of the fiber in a dyeing bath or according to a thermosol method (continuous dyeing method involving padding the fiber with a dye liquor, drying the resultant, and subjecting the dried product to a dry-heat treatment at high temperature). In contrast, in the case where the phosphorus compound is used, for example, the following processing methods are frequently employed (Patent Literature 2 and 3). The flame retardant is dissolved in a solvent or the like, and the flame retardant component is adhered onto the fiber by immersing the fiber in the solution. Alternatively, the flame retardant is emulsified and dispersed in at least one nonionic surfactant or anionic surfactant, and the flame retardant component is adhered onto the fiber by immersing the fiber in the dispersion simultaneously with its dyeing.

A trend toward the use of phosphorus compounds having higher safety as a flame retardant component for fibers instead of HBCD has been steadily progressing, but there still remain many problems. This is because of the following reasons. When the fiber is processed by the method involving dissolving the flame retardant in a solvent or the like, the solvent or a waste liquid is discharged to the atmosphere, and hence concern about the load on the environment is raised. In addition, when the method involving the use of at least one nonionic surfactant or anionic surfactant is employed, a flame retarding effect is observed, but the amount of flame retardant component adhered onto the fiber is not sufficient, and hence the durable flame retardancy of the fiber is liable to be insufficient. In order to continue to obtain a fiber having a flame retardant effect better than the currently available, the development and improvement of flame retardant compositions having such properties that a flame retardant component adheres in large amounts to fibers have been strongly desired.

CITATION LIST

Patent Literature

[PTL 1] JP 64-70555 A
[PTL 2] JP 2000-328445 A
[PTL 3] JP 2002-88368 A

SUMMARY OF INVENTION

Technical Problem

Therefore, an object of the present invention is to provide a flame retardant composition having such a property that a flame retardant component adheres onto fibers in larger amounts than in the case of flame retardant compositions used heretofore.

BRIEF DESCRIPTION OF DRAWINGS

FIGURE—Test Results of the Examples and Comparative Examples.

SOLUTION TO PROBLEM

Accordingly, the inventors of the present invention have made extensive investigations, and as a result, have reached the present invention. That is, according to one embodiment of the present invention, there is provided a flame retardant composition, comprising:

at least one phosphorus compound represented by the following general formula (1) or (2);
a cationic surfactant; and
a nonionic surfactant:

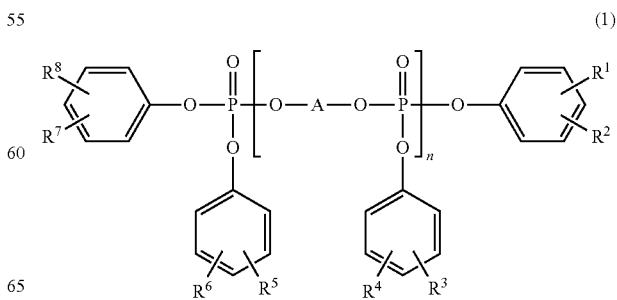

where A represents a divalent hydrocarbon group having 1 to 20 carbon atoms, n represents a number of from 1 to 10, and $R^1$ to $R^8$ each independently represent a hydrogen atom or an alkyl group having 1 to 20 carbon atoms;

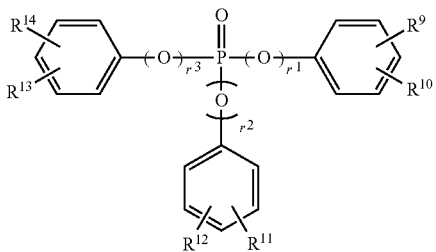

(2)

where $R^9$ to $R^{14}$ each independently represent a hydrogen atom or an alkyl group having 1 to 20 carbon atoms, and $r^1$, $r^2$, and $r^3$ each independently represent a number of 1 or 0.

Advantageous Effects of Invention

An effect of the present invention is the provision of a flame retardant composition having such a property that a flame retardant component adheres in larger amounts onto a fiber than in the case of a conventional-art product.

DESCRIPTION OF EMBODIMENTS

A flame retardant composition of the present invention includes: at least one phosphorus compound represented by the following general formula (1) or (2); a cationic surfactant; and a nonionic surfactant.

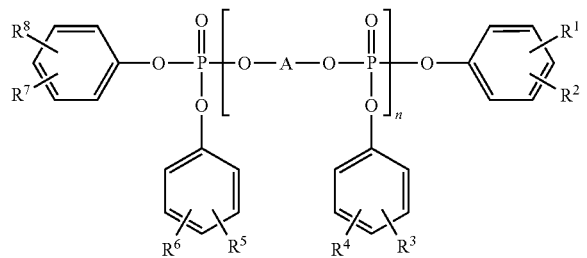

(1)

(In the formula, A represents a divalent hydrocarbon group having 1 to 20 carbon atoms, n represents a number of from 1 to 10, and $R^1$ to $R^8$ each independently represent a hydrogen atom or an alkyl group having 1 to 20 carbon atoms.)

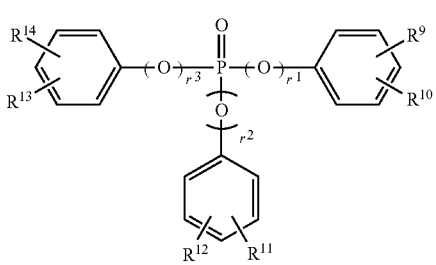

(2)

(In the formula, $R^9$ to $R^{14}$ each independently represent a hydrogen atom or an alkyl group having 1 to 20 carbon atoms, and $r^1$, $r^2$, and $r^3$ each independently represent a number of 1 or 0.)

In the general formula (1), $R^1$ to $R^8$ each independently represent a hydrogen atom or an alkyl group having 1 to 20 carbon atoms, and examples of such alkyl group include a methyl group, an ethyl group, a propyl group, an isopropyl group, a butyl group, an isobutyl group, a sec-butyl group, a tert-butyl group, a pentyl group, an amyl group, an isoamyl group, a hexyl group, a heptyl group, an isoheptyl group, an octyl group, an isooctyl group, a 2-ethylhexyl group, a nonyl group, an isononyl group, a decyl group, a dodecyl group, a tridecyl group, a tetradecyl group, a pentadecyl group, a hexadecyl group, a heptadecyl group, an octadecyl group, a nonadecyl group, an icosyl group, and isomers of all of these groups. Of those, $R^1$ to $R^8$ each represent preferably a hydrogen atom or an alkyl group having 1 to 10 carbon atoms, most preferably a hydrogen atom.

In the general formula (1), n represents an average polymerization degree and a number from 1 to 10, preferably a number from 1 to 5. More preferably n represents a number from 1 to 2, and most preferably n represents 1. In addition, the average polymerization degree n is calculated from the molar ratio of the compound represented by the general formula (1), and in the case of, for example, a composition formed of 50 mol % of a compound where n=1 and 50 mol % of a compound where n=2, the average polymerization degree is 1.5.

It should be noted that the value for n can be calculated from the result of high-performance liquid chromatography measurement.

In the general formula (1), A represents a divalent hydrocarbon group having 1 to 20 carbon atoms, and examples of such group include an aliphatic hydrocarbon group, an aromatic hydrocarbon group, and a cycloalkyl group. Examples of the aliphatic hydrocarbon group include a methylene group, an ethylene group, a propylene group, a butylene group, a pentylene group, a hexylene group, a heptylene group, an octylene group, a nonylene group, a decylene group, an undedecylene group, a dodecylene group, a tridecylene group, a tetradecylene group, a pentadecylene group, a hexadecylene group, a heptadecylene group, an octadecylene group, a nonadecylene group, an icosalene group, and isomers of all of these groups, and examples of the cycloalkyl group include a cyclopropylene group, a cyclobutylene group, a cyclopentylene group, a cyclohexylene group, a cycloheptylene group, a cyclooctylene group, a dicyclopentylene group, a tricyclopentylene group, and isomers of all of these groups. Examples of the aromatic hydrocarbon group include a group represented by the following general formula (3), a group represented by the following general formula (4), a group represented by the following general formula (5), a naphthylene group, and a 1,2-diphenylethylene group. In the case of the group represented by the general formula (3), three structures, i.e., an ortho form, a meta form, and a para form, are formed depending on bonding sites, and the compound may have any of the structures to have the same performance regardless of the difference in structure. Of those, A represents preferably an aromatic hydrocarbon group, more preferably a group represented by any one of the general formula (3), the general formula (4), and the general formula (5).

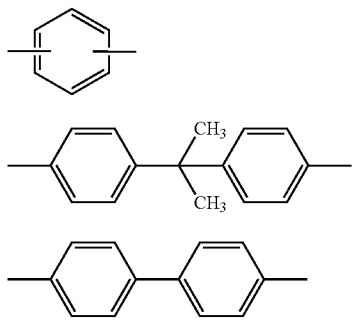

(3)
(4)
(5)

Specific examples of the compound represented by the general formula (1) include ethylene glycol bis (diphenyl phosphate), ethylene glycol bis (ditolylphosphate), ethylene glycol bis (dixylyl phosphate), ethylene glycol bis(di-n-butylphenyl phosphate), ethylene glycol bis(di-t-butylphenyl phosphate), ethylene glycol bis(diisopropylphenyl phosphate), ethylene glycol bis(dihexylphenyl phosphate), ethylene glycol bis(di-n-octylphenyl phosphate), ethylene glycol bis(di-2-ethylhexylphenyl phosphate), propylene glycol bis(diphenyl phosphate), propylene glycol bis(ditolyl phosphate), propylene glycol bis(dixylyl phosphate), propylene glycol bis(di-n-butylphenyl phosphate), propylene glycol bis(di-t-butylphenyl phosphate), propylene glycol bis(diisopropylphenyl phosphate), propylene glycol bis(dihexylphenyl phosphate), propylene glycol bis(di-n-octylphenyl phosphate), propylene glycol bis(di-2-ethylhexylphenyl phosphate), octylene glycol bis(diphenyl phosphate), octylene glycol bis(ditolyl phosphate), octylene glycol bis (dixylyl phosphate), octylene glycol bis(di-n-butylphenyl phosphate), octylene glycol bis(di-t-butylphenyl phosphate), octylene glycol bis(diisopropylphenyl phosphate), octylene glycol bis(dihexylphenyl phosphate), octylene glycol bis(di-n-octylphenyl phosphate), octylene glycol bis(di-2-ethylhexylphenyl phosphate), resorcinol bis(diphenyl phosphate), resorcinol bis(ditolyl phosphate), resorcinol bis (dixylyl phosphate), resorcinol bis(di-n-butylphenyl phosphate), resorcinol bis(di-t-butylphenyl phosphate), resorcinol bis(diisopropylphenyl phosphate), resorcinol bis (dihexylphenyl phosphate), resorcinol bis(di-n-octylphenyl phosphate), resorcinol bis(di-2-ethylhexylphenyl phosphate), bisphenol A bis(diphenyl phosphate), bisphenol A bis(ditolyl phosphate), bisphenol A bis(dixylyl phosphate), bisphenol A bis(di-n-butylphenyl phosphate), bisphenol A bis(di-t-butylphenyl phosphate), bisphenol A bis(diisopropylphenyl phosphate), bisphenol A bis(dihexylphenyl phosphate), bisphenol A bis(di-n-octylphenyl phosphate), bisphenol A bis(di-2-ethylhexylphenyl phosphate), biphenol bis (diphenyl phosphate), biphenolbis(ditolyl phosphate), biphenolbis(dixylyl phosphate), biphenol bis(di-n-butylphenyl phosphate), biphenol bis(di-t-butylphenyl phosphate), biphenol bis(diisopropylphenyl phosphate), biphenol bis(dihexylphenyl phosphate), biphenol bis(di-n-octylphenyl phosphate), and biphenol bis(di-2-ethylhexylphenyl phosphate).

In the general formula (2) $R^9$ to $R^{14}$ each independently represent a hydrogen atom or an alkyl group having 1 to 20 carbon atoms, and examples of such alkyl group include a methyl group, an ethyl group, a propyl group, an isopropyl group, a butyl group, an isobutyl group, a sec-butyl group, a tert-butyl group, a pentyl group, an amyl group, an isoamyl group, a hexyl group, a heptyl group, an octyl group, an isooctyl group, a 2-ethylhexyl group, a nonyl group, an isononyl group, a decyl group, a dodecyl group, a tridecyl group, a tetradecyl group, a pentadecyl group, a hexadecyl group, a heptadecyl group, an octadecyl group, a nonadecyl group, an icosyl group, and isomers of all of these groups. Of those, $R^9$ to $R^{14}$ each represent preferably a hydrogen atom or an alkyl group having 1 to 10 carbon atoms, more preferably a hydrogen atom or an alkyl group having 1 to 5 carbon atoms.

In the general formula (2) $r^1$, $r^2$, and $r^3$ each independently represent a number of 1 or 0, and the compound corresponding to any combination of the numbers has the same performance.

Specific examples of the compound represented by the general formula (2) in the case where a relationship $r^1=r^2=r^3=1$ is satisfied include triphenyl phosphate, tritolyl phosphate, trixylyl phosphate, tri-n-butylphenyl phosphate, tri-t-butylphenyl phosphate, triisopropylphenyl phosphate, trihexylphenyl phosphate, tri-n-octylphenyl phosphate, and tri-2-ethylhexylphenyl phosphate. Specific examples of the compound represented by the general formula (2) in the case where one of $r^1$, $r^2$, and $r^3$ represents 0, and the others each represent 1 include diphenyl phenylphosphonate, ditolyl phenylphosphonate, dixylyl phenylphosphonate, di-n-butylphenyl phenylphosphonate, di-t-butylphenyl phenylphosphonate, diisopropylphenyl phenylphosphonate, dihexylphenyl phenylphosphonate, di-n-octylphenyl phenylphosphonate, and di-2-ethylhexylphenylphenylphosphonate. Specific examples of the compound represented by the general formula (2) in the case where one of $r^1$, $r^2$, and $r^3$ represents 1, and the others each represent 0 include phenyl diphenylphosphinate, tolyl diphenylphosphinate, xylyl diphenylphosphinate, n-butylphenyl diphenylphosphinate, t-butylphenyl diphenylphosphinate, isopropylphenyl diphenylphosphinate, hexylphenyl diphenylphosphinate, n-octylphenyl diphenylphosphinate, and 2-ethylhexylphenyl diphenylphosphinate. Specific examples of the compound represented by the general formula (2) in the case where a relationship $r^1=r^2=r^3=0$ is satisfied include triphenylphosphine oxide, tritolylphosphine oxide, trixylylphosphine oxide, tri-n-butylphenylphosphine oxide, tri-t-butylphenylphosphine oxide, triisopropylphenylphosphine oxide, trihexylphenylphosphine oxide, tri-n-octylphenylphosphine oxide, and tri-2-ethylhexylphenylphosphine oxide.

Further, the compound represented by the general formula (1) or (2) may be used alone as a flame retardant component, or two or more kinds thereof may be used in combination. No matter what kinds of compounds are combined, the flame retardant components show no difference in their effect.

Any one of the known methods may be employed as a method of synthesizing the compound represented by the general formula (1), and the synthesis method is not particularly limited. Similarly, any one of the known methods may be employed as a method of synthesizing the compound represented by the general formula (2), and the synthesis method is not particularly limited.

The method of synthesizing the compound represented by the general formula (1) is specifically, for example, as described below. One or more kinds of compounds each having two hydroxyl groups in addition to a molecular structure corresponding to the group represented by A in the general formula (1) and phosphorus oxychloride are loaded, and the mixture is subjected to a reaction under a predetermined condition. Further, phenol is, or (one or two or more kinds of) phenol compounds having alkyl groups corresponding to $R^1$ to $R^8$ in the general formula (1) are, caused to react with the reaction product. Thus, the target compound represented by the general formula (1) can be obtained.

Examples of the compound containing two hydroxyl groups in addition to a molecular structure corresponding to the group represented by A in the general formula (1) include: aliphatic diols such as ethylene glycol, propylene glycol, and octylene glycol; and aromatic diols such as resorcinol, bisphenol A, and biphenol. Of those, an aromatic diol is preferred.

In addition, examples of the phenol compound include phenol, cresol, 3,4-dimethylphenol, 3,5-dimethylphenol, 2,3-dimethylphenol, 2,4-dimethylphenol, 2,5-dimethylphenol, 2,6-dimethylphenol, ethylphenol, n-butylphenol, t-butylphenol, n-propylphenol, isopropylphenol, pentylphenol, hexylphenol, heptylphenol, n-octylphenol, 2-ethylhexylphenol, nonylphenol, and decylphenol. Of those, phenol, cresol, 3,5-dimethylphenol, t-butylphenol, isopropylphenol, n-octylphenol, and 2-ethylhexylphenol are preferred.

For the method of synthesizing the compound represented by the general formula (2), when a relationship $r^1=r^2=r^3=1$ is satisfied, the target compound represented by the general formula (2) may specifically be obtained by subjecting phosphorus oxychloride and phenol or a phenol compound having alkyl groups corresponding to $R^9$ to $R^{14}$ in the general formula (2) (one kind or two or more kinds) to a reaction under a predetermined condition. When one of $r^1$, $r^2$, and $r^3$ represents 0, and the others each represent 1, the target compound represented by the general formula (2) may specifically be obtained by subjecting phenylphosphonic acid and phenol, or a phenol compound having alkyl groups corresponding to $R^9$ to $R^{14}$ in the general formula (2) (one kind or two or more kinds) to a reaction under a predetermined condition. When one of $r^1$, $r^2$, and $r^3$ represents 1, and the others each represent 0, the target compound represented by the general formula (2) may specifically be obtained by subjecting diphenylphosphinic acid and phenol or a phenol compound having alkyl groups corresponding to $R^9$ to $R^{14}$ in the general formula (2) to a reaction under a predetermined condition.

Examples of the phenol compound that may be used in these synthesis methods as described above include phenol, cresol, 3,4-dimethylphenol, 3,5-dimethylphenol, 2,3-dimethylphenol, 2,4-dimethylphenol, 2,5-dimethylphenol, 2,6-dimethylphenol, ethylphenol, n-butylphenol, t-butylphenol, n-propylphenol, isopropylphenol, pentylphenol, hexylphenol, heptylphenol, n-octylphenol, 2-ethylhexylphenol, nonylphenol, and decylphenol. Of those, phenol, cresol, 3,5-dimethylphenol, t-butylphenol, isopropylphenol, n-octylphenol, and 2-ethylhexylphenol are preferred.

In addition, for the method of synthesizing the compound represented by the general formula (2), when the relationship $r^1=r^2=r^3=0$ is satisfied, the target compound represented by the general formula (2) may specifically be obtained by oxidizing triphenylphosphine or a trialkylphenylphosphine obtained by subjecting phosphorus trichloride and a phenylmagnesium halide or an alkylphenylmagnesium halide to a reaction (or obtained by subjecting phosphorus trichloride and benzene or an alkylbenzene to a Friedel-Crafts reaction). The phenylmagnesium halide or the alkylphenylmagnesium halide in this case is obtained by causing phenyl fluoride or an alkylphenyl fluoride, phenyl chloride or an alkylphenyl chloride, phenyl bromide or an alkylphenyl bromide, or phenyl iodide or an alkylphenyl iodide to react with magnesium, and its alkyl moiety corresponds to any of $R^9$ to $R^{14}$ in the general formula (2).

Examples of the cationic surfactant to be used in the present invention include an amine represented by the following general formula (6), a salt obtained from the amine represented by the following general formula (6) and an acidic compound represented by the general formula (7), and a quaternary ammonium salt represented by the general formula (8). Some of such amine-based surfactants as represented by the following general formula (6) are typically classified into nonionic surfactants because the surfactants show weak cationic properties alone. In the description, however, an amine-based surfactant that dissolves in water to show a cationic property is also classified and used as a cationic surfactant. The surfactant that dissolves in water to show a cationic property is considered to contribute to an increase in amount of the phosphorus compound represented by either one of the general formulae (1) and (2) adhered onto a fiber. The amine represented by the general formula (6) containing an oxyethylene group dissolves in water to show a cationic property.

(6)

(In the formula, $R^{15}$ to $R^{17}$ each independently represent a hydrocarbon group having 1 to 20 carbon atoms, a group represented by $-(G-O)_m-H$ (where G represents an alkylene group having 2 carbon atoms and m represents a number of from 1 to 100), or a group that has 1 to 20 carbon atoms and has one or more kinds of substituents selected from an ester group, an amide group, and a hydroxyl group, provided that one or two groups represented by $-(G-O)_m-H$ are necessarily included.)

(7)

(In the formula, X represents an anionic atom or or an anionic group.)

(8)

(In the formula, $R^{18}$ to $R^{21}$ each independently represent a hydrocarbon group having 1 to 20 carbon atoms, a group represented by $-(L-O)_q-H$ (where L represents an alkylene group having 2 to 4 carbon atoms and q represents a number of from 1 to 100), or a group that has 1 to 20 carbon atoms and has one or more kinds of substituents selected from an ester group, an amide group, and a hydroxyl group, and Y represents an anionic atom or an anionic group.)

$R^{15}$ to $R^{17}$ of the amine compound represented by the general formula (6) each independently represent a hydrocarbon group having 1 to 20 carbon atoms, a group represented by $-(G-O)_m-H$ (where G represents an alkylene group having 2 carbon atoms), or a group that has 1 to 20 carbon atoms and has one or more kinds of substituents selected from an ester group, an amide group, and a hydroxyl group. However, when the amine compound represented by the general formula (6) is used as the cationic surfactant in the flame retardant composition of the present invention, one or two groups represented by $-(G-O)_m-H$ must necessarily be included in the amine compound. Here, the compound represented by the general formula (6) containing one or two groups represented by $-(G-O)_m-H$ is referred to as "polyether group-containing cationic surfactant."

First, examples of the hydrocarbon group having 1 to 20 carbon atoms represented by any one of $R^{15}$ to $R^{17}$ include a saturated aliphatic hydrocarbon group, an unsaturated aliphatic hydrocarbon group, an aromatic hydrocarbon group, and a cycloalkyl group. Examples of the saturated aliphatic hydrocarbon group include a methyl group, an ethyl group, a propyl group, a butyl group, a pentyl group, a hexyl group, a heptyl group, an octyl group, a nonyl group, a decyl group, an undedecyl group, a dodecyl group, a tridecyl group, a tetradecyl group, a pentadecyl group, a hexadecyl group, heptadecyl group, an octadecyl group, a nonadecyl group, an icosyl group, and isomers of all of these groups. Examples of the unsaturated aliphatic hydrocarbon group include an ethenyl group (vinyl group), a propenyl group (allyl group), a butenyl group, a pentenyl group, a hexenyl group, a heptenyl group, an octenyl group, a nonenyl group, a decenyl group, an undedecenyl group, a dodecenyl group, a tridecenyl group, a tetradecenyl group, a pentadecenyl group, a hexadecenyl group, a heptadecenyl group, an octadecenyl group, a nonadecenyl group, an icosenyl group, and isomers of all of these groups. Examples of the aromatic hydrocarbon group include a phenyl group, a tolyl group, a xylyl group, a cumenyl group, a mesityl group, a benzyl group, a phenethyl group, a styryl group, a cinnamyl group, a benzhydryl group, a trityl group, an ethylphenyl group, a propylphenyl group, a butylphenyl group, a pentylphenyl group, a hexylphenyl group, a heptylphenyl group, an octylphenyl group, a nonylphenyl group, a decylphenyl group, an undedecylphenyl group, a dodecylphenyl group, a styrenated phenyl group, a p-cumylphenyl group, a phenylphenyl group, a benzylphenyl group, an α-naphthyl group, a β-naphthyl group, and isomers of all of these groups. Examples of the cycloalkyl group include a cyclopentyl group, a cyclohexyl group, a cycloheptyl group, a methylcyclopentyl group, a methylcyclohexyl group, a methylcycloheptyl group, a cyclopentenyl group, a cyclohexenyl group, a cycloheptenyl group, a methylcyclopentenyl group, a methylcyclohexenyl group, a methylcycloheptenyl group, and isomers of all of these groups. Here, a hydrocarbon group having 8 to 20 carbon atoms is preferred, a hydrocarbon group having 12 to 20 carbon atoms is more preferred, and a hydrocarbon group having 15 to 20 carbon atoms is most preferred.

Next, G in a group represented by $-(G-O)_m-H$ represents an alkylene group having 2 carbon atoms, and specifically represents an ethylene group. Further, when one group represented by $-(G-O)_m-H$ is included in the amine compound, m represents a number of from 1 to 100, preferably from 5 to 80, more preferably from 10 to 60. In addition, when two groups represented by $-(G-O)_m-H$ are included in the amine compound, the sum of m's of the respective groups represents a number of from 1 to 100, preferably from 5 to 80, more preferably from 10 to 60.

Finally, examples of the group that has 1 to 20 carbon atoms and has one or more kinds of substituents selected from an ester group, an amide group, and a hydroxyl group include: a group obtained by substituting hydrogen atoms at one or two or more sites of any one of the hydrocarbon groups listed above with hydroxyl groups; and a group obtained by introducing ester groups or amide groups into one or two or more carbon-carbon bonds of any one of the hydrocarbon groups to substitute the group. No other particular limitations are imposed on those groups as long as the total number of carbon atoms in each of the groups is from 1 to 20.

The acidic compound represented by the general formula (7) is an acidic substance to be used for forming a salt with the amine compound represented by the general formula (6), and X represents an anionic atom or an anionic group. Examples of the anionic atom include halogen atoms such as a chlorine atom, a bromine atom, and an iodine atom, and examples of the anionic group include monoalkylsulfate groups each having 1 to 4 carbon atoms such as a methylsulfate group and an ethylsulfate group, a hydrogen sulfate group, an acetoxy group, a hydrogen phosphate group, a nitrate group, and a glycolate group. Examples of the acidic compound represented by the general formula (7) include: inorganic acidic substances such as hydrochloric acid, hydrobromic acid, hydriodic acid, sulfuric acid, phosphoric acid, and nitric acid; and organic acidic substances such as acetic acid, a monoalkylsulfuric acid, and glycolic acid. X preferably represents a halogen atom, a monoalkylsulfate group having 1 to 4 carbon atoms, an acetoxy group, a hydrogen phosphate group, or a glycolate group.

When the salt obtained from the compound represented by the general formula (6) and the compound represented by the general formula (7) is used as the cationic surfactant of the flame retardant composition of the present invention, the salt is preferably a salt of the amine compound represented by the general formula (6) containing one or two groups represented by $-(G-O)_m-H$. Here, such compound is also referred to as a "polyether group-containing cationic surfactant."

$R^{18}$ to $R^{21}$ of the compound represented by the general formula (8) each independently represent a hydrocarbon group having 1 to 20 carbon atoms, a group represented by $-(L-O)_q-H$, or a group that has 1 to 20 carbon atoms and has one or more kinds of substituents selected from an ester group, an amide group, and a hydroxyl group. Here, the compound represented by the general formula (8) containing at least one group represented by $-(L-O)_q-H$ is also referred to as a "polyether group-containing cationic surfactant."

First, examples of the hydrocarbon group having 1 to 20 carbon atoms in any one of $R^{18}$ to $R^{21}$ include a saturated aliphatic hydrocarbon group, an unsaturated aliphatic hydrocarbon group, an aromatic hydrocarbon group, and a cycloalkyl group. Examples of the saturated aliphatic hydrocarbon group include a methyl group, an ethyl group, a propyl group, a butyl group, a pentyl group, a hexyl group, a heptyl group, an octyl group, a nonyl group, a decyl group, an undedecyl group, a dodecyl group, a tridecyl group, a tetradecyl group, a pentadecyl group, a hexadecyl group, a heptadecyl group, an octadecyl group, a nonadecyl group, an icosyl group, and isomers of all of these groups. Examples of the unsaturated aliphatic hydrocarbon group include an ethenyl group (vinyl group), a propenyl group (allyl group), a butenyl group, a pentenyl group, a hexenyl group, a heptenyl group, an octenyl group, a nonenyl group, a decenyl group, an undedecenyl group, a dodecenyl group, a tridecenyl group, a tetradecenyl group, a pentadecenyl group, a hexadecenyl group, a heptadecenyl group, an octadecenyl group, a nonadecenyl group, an icosenyl group, and isomers of all of these groups, and examples of the aromatic hydrocarbon group include a phenyl group, a tolyl group, a xylyl group, a cumenyl group, a mesityl group, a benzyl group, a phenethyl group, a styryl group, a cinnamyl group, a benzhydryl group, a trityl group, an ethylphenyl group, a propylphenyl group, a butylphenyl group, a pentylphenyl group, a hexylphenyl group, a heptylphenyl group, an octylphenyl group, a nonylphenyl group, a decylphenyl group, an undedecylphenyl group, a dodecylphenyl group, a styrenated phenyl group, a p-cumylphenyl group, a phenylphenyl group, a benzylphenyl group, an α-naphthyl group, a β-naphthyl group, and isomers of all of these groups. Examples of the cycloalkyl group include a cyclopentyl group, a cyclohexyl group, a cycloheptyl group, a methylcyclopentyl group, amethylcyclohexyl group, amethylcycloheptyl group, a cyclopentenyl group, a cyclohexenyl group, a cycloheptenyl group, methylcyclopentenyl group, a methylcyclohexenyl group, methylcycloheptenyl group, and isomers of all of these groups.

Next, L in a group represented by $-(L-O)_q-H$ represents an alkylene group having 2 to 4 carbon atoms, and examples of the alkylene group having 2 to 4 carbon atoms include an ethylene group, a propylene group, and a butylene group, and isomers of all the groups. Of those, an ethylene group or a propylene group is preferred, and a propylene group is more preferred. Further, q in a group represented by $-(L-O)_q-H$ represents a number of from 1 to 100, preferably from 5 to 80, more preferably from 10 to 60. In addition, $-(L-O)_q-H$ may be a homopolymer of any one of the alkylene groups each having 2 to 4 carbon atoms such as an ethylene group, a propylene group, and a butylene group, or may be a block or random polymer of two or more kinds selected from the alkylene groups each having 2 to 4 carbon atoms such as an ethylene group, a propylene group, and a butylene group.

Finally, examples of the group that has 1 to 20 carbon atoms and has one or more kinds of substituents selected from an ester group, an amide group, and a hydroxyl group include: a group obtained by substituting hydrogen atoms at one or two or more sites of any one of the hydrocarbon groups listed above with hydroxyl groups; and a group obtained by introducing ester groups or amide groups into one or two or more carbon-carbon bonds of any one of the hydrocarbon groups to substitute the group. No other particular limitations are imposed on those groups as long as the total number of carbon atoms in each of the groups is from 1 to 20.

It is preferred that at least one of $R^{18}$ to $R^{21}$ in the compound represented by the general formula (8) represent a group represented by $-(L-O)_q-H$ (L=an ethylene group or a propylene group, q=1 to 100), or a group that has 1 to 20 carbon atoms and has one or more kinds of substituents selected from an ester group, an amide group, and a hydroxyl group out of the groups described above, and the others each represent a hydrocarbon group having 1 to 10 carbon atoms out of the groups described above. It is more preferred that at least one of $R^{18}$ to $R^{21}$ in the compound represent a group represented by $-(L-O)_q-H$ (L=a propylene group, q=10 to 60), and the others each represent a hydrocarbon group having 1 to 5 carbon atoms.

Y in the compound represented by the general formula (8) represents an anionic atom or an anionic group. Examples of the anionic atom include halogen atoms such as a chlorine atom, a bromine atom, and an iodine atom, and examples of the anionic group include monoalkylsulfate groups each having 1 to 4 carbon atoms such as a methylsulfate group and an ethylsulfate group, a hydrogen sulfate group, an acetoxy group, a hydrogen phosphate group, a nitrate group, and a glycolate group. Y represents preferably a halogen atom, a monoalkylsulfate group having 1 to 4 carbon atoms, or a hydrogen sulfate group, more preferably a chlorine atom, a bromine atom, a methylsulfate group, or a hydrogen sulfate group.

Specific examples of the quaternary ammonium salt represented by the general formula (8) include a monoalkyltrimethylammonium salt, a dialkyldimethylammonium salt, a trialkylmonomethylammonium salt, a monoalkyltriethylammonium salt, a dialkyldiethylammonium salt, and a trialkylmonoethylammonium salt. Further, the examples include: a quaternary ammonium salt obtained by substituting hydrogen atoms at one or two or more sites of any one of the hydrocarbon groups listed above with hydroxyl groups or by introducing ester groups or amide groups into one or two or more carbon-carbon bonds of any one of the hydrocarbon groups to substitute the group; and the quaternary ammonium salt represented by the general formula (8) in which at least one of $R^{18}$ to $R^{21}$ represents a group represented by $-(L-O)_q-H$. Of those, for example, the quaternary ammonium salt represented by the general formula (8) in which one or two of $R^{18}$ to $R^{21}$ each represent a group represented by $-(L-O)_q-H$ is preferred because the effect of the present invention is easily obtained.

As can be seen from the foregoing, irrespective of which one of the cationic surfactants, i.e., the amine represented by the general formula (6), the salt obtained from the amine represented by the general formula (6) and the acidic compound represented by the general formula (7), and the quaternary ammonium salt represented by the general formula (8) the cationic surfactant to be used in the present invention is, the cationic surfactant is preferably a polyether group-containing cationic surfactant because the effect of the present invention is easily exhibited. In addition, one kind of the cationic surfactants, i.e., the amine represented by the general formula (6), the salt obtained from the amine represented by the general formula (6) and the acidic compound represented by the general formula (7), and the quaternary ammonium salt represented by the general formula (8) may be used alone as the cationic surfactant to be used in the present invention, or two or more kinds thereof may be used in combination. However, it is preferred that one or both of the amine represented by the general formula (6) and the quaternary ammonium salt represented by the general formula (8), each containing a polyether group, be used because the effect of the present invention can be easily obtained.

In addition, with regard to methods of producing and synthesizing the amine represented by the general formula (6), the salt obtained from the amine represented by the general formula (6) and the acidic compound represented by the general formula (7), and the quaternary ammonium salt represented by the general formula (8), these compounds may be produced and synthesized by any known method.

Here, examples of the method of synthesizing the amine compound represented by the general formula (6) include: a substitution reaction in which ammonia, an amine, or the like acts as a nucleophilic reagent on an alkyl halide, an alkyl sulfonate, or the like; the reduction reaction of a nitro group, an azide, an amide, an imine, an oxime, a nitrile, an azo compound, or the like; and the hydrolysis reaction of an amide, an imine, an isocyanate, or the like. In addition to the foregoing, various reactions can also be given. However, any synthesis method may be employed as long as an amine compound having groups corresponding to $R^{15}$ to $R^{17}$ of the general formula (6) is obtained. However, the cationic surfactant represented by the general formula (6) that exhibits an effect in the flame retardant composition of the present invention is a polyether group-containing cationic surfactant, and is preferably obtained by synthesizing an alkanolamine according to anyone of the methods and causing an alkylene oxide having 2 carbon atoms (ethylene oxide) to react with the alkanolamine.

Next, with regard to the method of synthesizing the amine salt obtained from the amine compound represented by the general formula (6) and the acidic compound represented by the general formula (7), the target amine salt can be obtained by, for example, subjecting an amine compound having groups corresponding to $R^{15}$ to $R^{17}$ in the general formula (6) and the acidic compound represented by the general formula (7) such as hydrochloric acid to a neutralization reaction. However, the amine salt that exhibits an effect as the cationic surfactant of the present invention in the flame retardant composition of the present invention is a polyether group-containing cationic surfactant, and a specific method of synthesizing the polyether group-containing amine salt is as described below. An alkanolamine is used as a raw material, the alkanolamine and the acidic compound are subjected to a neutralization reaction, and then an alkylene oxide having 2 carbon atoms (ethylene oxide) is added to the resultant, whereby the target polyether group-containing amine salt can be obtained. Alternatively, the salt can be obtained by causing the alkylene oxide having 2 carbon atoms (ethylene oxide) to react with the alkanolamine in advance, and subjecting the resultant and the acidic compound to a neutralization reaction.

In addition, with regard to the method of synthesizing the quaternary ammonium salt represented by the general formula (8), the target quaternary ammonium salt can be obtained by, for example, subjecting an amine compound having alkyl groups corresponding to $R^{18}$ to $R^{20}$ in the general formula (8) and an alkyl halide having an alkyl group corresponding to $R^{21}$ therein to a quaternization reaction under a predetermined condition. However, a quaternary ammonium salt preferred as the cationic surfactant to be used in the flame retardant composition of the present invention is a polyether group-containing cationic surfactant, and in order that the polyether group-containing quaternary ammonium salt may be synthesized, specifically, an alkanolamine has only to be used as the amine compound serving as a raw material. The alkanolamine and the alkyl halide are subjected to a quaternization reaction, and then an alkylene oxide having 2 to 4 carbon atoms (such as ethylene oxide or propylene oxide) is added to the resultant, whereby the target polyether group-containing quaternary ammonium salt can be obtained. Alternatively, the salt can be obtained by causing the alkylene oxide having 2 to 4 carbon atoms (such as ethylene oxide or propylene oxide) to react with the alkanolamine in advance, and subjecting the resultant and the alkyl halide to a quaternization reaction. It should be noted that propylene oxide is preferably used in the synthesis method.

The nonionic surfactant is further incorporated into the flame retardant composition of the present invention for improving the emulsion stability of the flame retardant composition. Unless the composition contains the nonionic surfactant, it becomes difficult to emulsify the composition and hence sufficient effect of the present invention cannot be obtained. Examples of the nonionic surfactant to be used in the present invention include: ester-type nonionic surfactants such as a glycerin fatty acid ester, a sorbitan fatty acid ester, a polyoxyethylene sorbitan fatty acid ester, a sucrose fatty acid ester, a polyglycerin fatty acid ester, and a polyethylene glycol fatty acid ester; ether-type nonionic surfactants such as a polyoxyalkylene alkyl ether, a polyoxyalkylene alkylphenyl ether, a polyoxyalkylene alkenyl ether, a polyoxyethylene polyoxypropylene alkyl ether (ethylene oxide and propylene oxide may be bonded in any one of random and block manners), an alkylene oxide adduct of a polyalkylene glycol, an alkyl (poly)glycerin ether, an alkylene oxide adduct of benzylated phenol, and an alkylene oxide adduct of styrenated phenol; an alkylene oxide adduct of a fatty acid methyl ester; and an alkyl polyglucoside. Those compounds may be produced and synthesized by any known method. Of the nonionic surfactants, such an ether-type nonionic surfactant as represented by the following general formula (9) is particularly preferred.

$$R^{22}-O-(ZO)_h-H \qquad (9)$$

(In the formula, $R^{22}$ represents a hydrocarbon group having 1 to 30 carbon atoms, Z represents an alkylene group having 2 to 4 carbon atoms, and h represents a number of from 1 to 100.)

In the general formula (9), $R^{22}$ represents a hydrocarbon group having 1 to 30 carbon atoms. Examples of such hydrocarbon group include a saturated aliphatic hydrocarbon group, an unsaturated aliphatic hydrocarbon group, an aromatic hydrocarbon group, and a cycloalkyl group. Examples of the saturated aliphatic hydrocarbon group include a methyl group, an ethyl group, a propyl group, a butyl group, a pentyl group, a hexyl group, a heptyl group, an octyl group, a nonyl group, a decyl group, an undecyl group, a dodecyl group, a tridecyl group, a tetradecyl group, a pentadecyl group, a hexadecyl group, a heptadecyl group, an octadecyl group, a nonadecyl group, an icosyl group, a henicosyl group, a docosyl group, a tricosyl group, a tetracosyl group, a pentacosyl group, a hexacosyl group, a heptacosyl group, an octacosyl group, a nonacosyl group, a triacontyl group, and isomers of all of these groups, and examples of the unsaturated aliphatic hydrocarbon group include an ethenyl group (vinyl group), a propenyl group (allyl group), a butenyl group, a pentenyl group, a hexenyl group, a heptenyl group, an octenyl group, a nonenyl group, a decenyl group, an undecenyl group, a dodecenyl group, a tridecenyl group, a tetradecenyl group, a pentadecenyl group, a hexadecenyl group, a heptadecenyl group, an octadecenyl group, a nonadecenyl group, an icosenyl group, a henicosenyl group, a docosenyl group, a tricosenyl group, a tetracosenyl group, a pentacosenyl group, a hexacosenyl group, a heptacosenyl group, an octacosenyl group, a nonacosenyl group, a triacontenyl group, and isomers of all of these groups. Examples of the aromatic hydrocarbon group include a phenyl group, a tolyl group, a xylyl group, a cumenyl group, a mesityl group, a benzyl group, a phenethyl group, a styryl group, a cinnamyl group, a benzhydryl group, a trityl group, an ethylphenyl group, a propylphenyl group, a butylphenyl group, a pentylphenyl group, a hexylphenyl group, a heptylphenyl group, an octylphenyl group, a nonylphenyl group, a decylphenyl group, an undecylphenyl group, a dodecylphenyl group, a monostyrenated phenyl group, a distyrenated phenyl group, a tristyrenated phenyl group, a p-cumylphenyl group, a phenylphenyl group, a benzylphenyl group, an α-naphthyl group, a β-naphthyl group, and isomers of all of these groups. Examples of the cycloalkyl group include a cyclopentyl group, a cyclohexyl group, a cycloheptyl group, a methylcyclopentyl group, a methylcyclohexyl group, a methylcycloheptyl group, a cyclopentenyl group, a cyclohexenyl group, a cycloheptenyl group, a methylcyclopentenyl group, a methylcyclohexenyl group, a methylcycloheptenyl group, and isomers of all of these groups. Of those, a saturated aliphatic hydrocarbon group, an unsaturated aliphatic hydrocarbon group, and an aromatic hydrocarbon group are preferred, an unsaturated aliphatic hydrocarbon group and an aromatic hydrocarbon group are more preferred, an aromatic hydrocarbon group is still more preferred, and any one of a monostyrenated phenyl group, a distyrenated phenyl group, and a tristyrenated phenyl group or a combination thereof is particularly preferred.

In addition, Z of the compound represented by the general formula (9) represents an alkylene group having 2 to 4 carbon atoms, and examples of the alkylene group having 2 to 4 carbon atoms include an ethylene group, a propylene group, and a butylene group, and isomers of all the groups. Of those, an ethylene group or a propylene group is preferred, and an ethylene group is more preferred. In addition, no problem arises even when Z's represent two or more kinds of different groups, and the groups may be subjected to random polymerization or may be subjected to block polymerization. Further, h in the group represented by the general formula (9) represents a number of from 1 to 100, preferably from 5 to 50, more preferably from 10 to 40. In addition, one or more nonionic surfactants can be used in the flame retardant composition of the present invention, and it does not affect the effect of the present invention even if plural nonionic surfactants are used. However, the nonionic surfactant is preferably such an ether-type nonionic surfactant as represented by the general formula (9) in which $R^{22}$ represents an aromatic hydrocarbon group because the effect of the present invention is easily obtained.

The usages of the cationic surfactant and nonionic surfactant to be used in the flame retardant composition of the present invention are not particularly limited, but the usage of the cationic surfactant is preferably from 1 part by mass to 10 parts by mass, more preferably from 1.2 parts by mass to 5 parts by mass with respect to 100 parts by mass of the phosphorus compound used in the flame retardant composition of the present invention. Further, the usage of the nonionic surfactant is preferably from 10 parts by mass to 60 parts by mass, more preferably from 20 parts by mass to 50 parts by mass with respect to 100 parts by mass of the phosphorus compound. When the usage of the cationic surfactant is less than 1 part by mass, the property by which the flame retardant component is adhered onto a fiber may reduce, and when the usage of the nonionic surfactant is less than 10 parts by mass, the emulsion stability of the flame retardant composition may reduce. In contrast, when the usage of the cationic surfactant is excessively increased, cost benefit may weaken because the surfactant is expensive, and when the usage of the nonionic surfactant is excessively increased, a reduction in flame retardancy of the composition may occur. Further, the usage of water to be used in the flame retardant composition of the present invention is not particularly limited, but the usage is preferably from 150 parts by mass to 300 parts by mass, more preferably from 180 parts by mass to 250 parts by mass with respect to 100 parts by mass of the phosphorus compound to be used in the flame retardant composition of the present invention. When the usage is less than 150 parts by mass, the viscosity of an emulsion of the flame retardant composition may become excessively high, and when the usage is 300 parts by mass or more, the long-term stability of the emulsion may reduce.

The flame retardant composition of the present invention is preferably a high-concentration liquid having good long-term stability at the time of its transportation or storage. Specific formulation is preferably as follows: the content of the phosphorus compound to be used in the flame retardant composition of the present invention is from 20 mass % to 40 mass % of the entirety of the flame retardant composition, the content of the cationic surfactant is from 0.2 mass % to 4 mass %, the content of the nonionic surfactant is from 2 mass % to 20 mass %, and the balance is water. When the content of the phosphorus compound is less than 20 mass %, the amount of flame retardant composition used in increased in order to exhibit functionality, and hence cost benefit weakens in some cases. In addition, when the content of the phosphorus compound is more than 40 mass %, the viscosity may become excessively high.

When a fiber is treated with the flame retardant composition of the present invention, the flame retardant composition of the present invention having the above-mentioned component concentrations is preferably further diluted with water before its use. The dilution ratio is as follows: the flame retardant composition of the present invention is diluted with water by a factor of preferably from 30 to 2,500, more preferably from 50 to 1,000. When the flame retardant composition is diluted by a factor of more than 2,500 and hence the concentration of an effective component becomes excessively low, it may become difficult to adhere a sufficient amount of the effective component onto the substrate. In addition, when the flame retardant composition is diluted by a factor of 30 or less, a desired effect is exhibited but an effect commensurate with the consumption of the flame retardant composition is not obtained in some cases.

Thus, the concentration of the phosphorus compound in the flame retardant composition when treating the fiber is adjusted to 0.008 mass % or more, preferably from 0.008 mass % to 1.33 mass %, the concentration of the cationic surfactant is adjusted to 0.00008 mass % or more, preferably from 0.00008 mass % to 0.13 mass %, and the concentration of the nonionic surfactant is adjusted to 0.0008 mass % or more, preferably from 0.0008 mass % to 0.67 mass %.

In addition, when the fiber is subjected to a flame retardant treatment with a diluted flame retardant composition, the flame retardant composition having the above-mentioned concentrations of the effective components is used in a liquid amount of from 5 ml to 50 ml with respect to a weight of the texture of 1 g. That is, when 20 g of the texture is subjected to the flame retardant treatment, 100 ml to 1,000 ml of the flame retardant composition having the above-mentioned concentrations of the effective components is needed.

The flame retardant composition of the present invention can be produced by any known method without any problem, and the production method is not particularly limited. For example, when water is gradually added to the mixture of the phosphorus compound, cationic surfactant, and nonionic surfactant to be used in the flame retardant composition of the present invention while the mixture is stirred, the phosphorus compound can be emulsified and dispersed in the water. In addition, the following can be adopted: the mixture of the phosphorus compound, cationic surfactant, and nonionic surfactant to be used in the flame retardant composition of the present invention, and water are loaded in one stroke, and the phosphorus compound is emulsified and dispersed in the water with a homogenizer or the like.

The following agents may be contained or mixed in the flame retardant composition of the present invention: antioxidants, UV absorber, water resistant agents, preservatives and antibacterial agents, insecticidal and antiseptic agents, dispersants, antifoaming agents, deodorant, perfume, thickeners, viscosity modifiers, dyes, pigments, and the like.

In addition, a flame retardant fiber of the present invention is a fiber treated with the flame retardant composition of the present invention, and as a fiber material that may be used, there are given, for example: natural fibers such as hair fiber, wool fiber, silk fiber, hemp fiber, angora fiber, mohair fiber, and asbestos fiber; regenerated fibers such as rayon fiber and Bemberg fiber; semi-synthetic fibers such as acetate fiber;

synthetic fibers such as polyester fiber, polyamide fiber, polyacrylonitrile fiber, polyvinyl chloride fiber, vinylon fiber, a polyethylene fiber, polypropylene fiber, and spandex fiber; and inorganic fibers such as glass fiber, carbon fiber, and silicon carbide fiber. Of those, semi-synthetic fibers and synthetic fibers are preferred, synthetic fibers are more preferred, and polyester fibers are most preferred.

In addition, any known method may be employed as a specific treatment method for the fiber treated with the flame retardant composition of the present invention, and for example, the following processing method is preferred because the treatment can be performed simply and at a low cost: the flame retardant composition of the present invention is diluted with water so that the concentration of each effective component may be adjusted to a concentration suitable for the treatment of the fiber, and then the flame retardant component is adhered onto the fiber by immersing the fiber in the flame retardant composition and subjecting the resultant to a thermal processing treatment.

EXAMPLES

Now, the present invention will be described in more detail by way of the Examples. However, the present invention is by no means limited by Examples described below.

(Re: Flame retardant Component Phosphorus Compounds A, B, C, and H)

Method of Synthesizing Phosphorus Compound A

22 Grams (0.2 mol) of resorcinol (Mw-110) and 184 g (1.2 mol) of phosphorus oxychloride (Mw=153) were loaded into a four-necked flask having a volume of 500 ml mounted with a temperature gauge, a nitrogen-introducing tube, and an agitator, where the inside had been replaced with nitrogen, and the mixture was subjected to a reaction at 100° C. for 30 minutes. After that, the reaction product was further subjected to a reaction for 5 hours while hydrochloric acid produced at from 100° C. to 110° C. was expelled with a nitrogen gas. Hydrochloric acid and unreacted phosphorus oxychloride were removed at 100° C. under reduced pressure, and the residue was cooled to 50° C. After that, 0.2 g (0.002 mol) of anhydrous magnesium chloride (Mw=95) and 75 g (0.8 mol) of phenol (Mw=94) were added to the cooled product, and the mixture was subjected to a reaction at 120° C. for 30 minutes. After that, the reaction product was further subjected to a reaction at 145° C. for 5 hours while produced hydrochloric acid was expelled with a nitrogen gas. Pressure in the system was reduced and low-boiling impurities were removed by distillation. Thus, a phosphorus compound A (in the general formula (1), $R^1$ to $R^8$=hydrogen atoms, n=1, A=a group represented by the general formula (3) (meta form)) as a target product was obtained.

Method of Synthesizing Phosphorus Compound B

46 Grams (0.2 mol) of bisphenol A (Mw=228) and 184 g (1.2 mol) of phosphorus oxychloride (Mw=153) were loaded into a four-necked flask having a volume of 500 ml mounted with a temperature gauge, a nitrogen-introducing tube, and an agitator, where the inside had been replaced with nitrogen, and the mixture was subjected to a reaction at 100° C. for 30 minutes. After that, the reaction product was further subjected to a reaction for 5 hours while hydrochloric acid produced at from 100° C. to 110° C. was expelled with a nitrogen gas. Hydrochloric acid and unreacted phosphorus oxychloride were removed at 100° C. under reduced pressure, and the residue was cooled to 50° C. After that, 0.2 g (0.002 mol) of anhydrous magnesium chloride (Mw=95) and 75 g (0.8 mol) of phenol (Mw=94) were added to the cooled product, and the mixture was subjected to a reaction at 120° C. for 30 minutes. After that, the reaction product was further subjected to a reaction at 145° C. for 5 hours while produced hydrochloric acid was expelled with a nitrogen gas. Pressure in the system was reduced and low-boiling impurities were removed by distillation. Thus, a phosphorus compound B (in the general formula (1), $R^1$ to $R^8$=hydrogen atoms, n=1, A=a group represented by the general formula (4)) as a target product was obtained.

Method of Synthesizing Phosphorus Compound C

77 Grams (0.5 mol) of phosphorus oxychloride (Mw=153) and 178 g (1.65 mol) of p-cresol (Mw=108) were loaded into a four-necked flask having a volume of 500 ml mounted with a temperature gauge, a nitrogen-introducing tube, and an agitator, where the inside had been replaced with nitrogen, and 0.3 g (0.003 mol) of magnesium chloride was further added as a catalyst to the system. After replacement with nitrogen, temperature in the system was increased to 130° C. while the mixture was stirred, and the mixture was subjected to a reaction at 130° C. for 3 hours while produced hydrochloric acid was expelled with a nitrogen gas. After that, the temperature was increased to 145° C., and the reaction product was subjected to a reaction at 145° C. for 5 hours. Pressure in the system was reduced and low-boiling impurities were removed by distillation. Thus, a phosphorus compound C (compound represented by the general formula (2) in which $R^9$, $R^{11}$, and $R^{13}$=methyl groups, $R^{10}$, $R^{12}$, and $R^{14}$=hydrogen atoms, $r^1=r^2=r^3=1$) as a target product was obtained.

Method of Synthesizing Phosphorus Compound H

22 Grams (0.2 mol) of resorcinol (Mw=110) and 184 g (1.2 mol) of phosphorus oxychloride (Mw-153) were loaded into a four-necked flask having a volume of 500 ml mounted with a temperature gauge, a nitrogen-introducing tube, and an agitator where the inside had been replaced with nitrogen, and the mixture was subjected to a reaction at 100° C. for 30 minutes. After that, the reaction product was further subjected to a reaction for 5 hours while hydrochloric acid produced at from 100° C. to 110° C. was expelled with a nitrogen gas. Hydrochloric acid and unreacted phosphorus oxychloride were removed at 100° C. under reduced pressure, and the residue was cooled to 50° C. After that, 0.2 g (0.002 mol) of anhydrous magnesium chloride (Mw=95) and 98 g (0.8 mol) of 2,6-dimethylphenol (Mw-122) were added to the cooled product, and the mixture was subjected to a reaction at 120° C. for 30 minutes. After that, the reaction product was further subjected to a reaction at 145° C. for 5 hours while produced hydrochloric acid was expelled with a nitrogen gas. Pressure in the system was reduced and low-boiling impurities were removed by distillation. Thus, a phosphorus compound H (in the general formula (1), $R^1$ to $R^9$-methyl groups, n=1, Ar=a group represented by the general formula (3) (meta form)) as a target product was obtained.

Re: Cationic Surfactant Component

Cationic Surfactant D

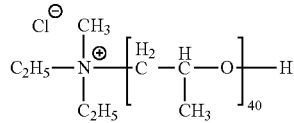
(10)

Cationic Surfactant E

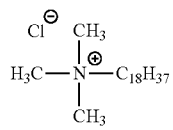
(11)

Cationic Surfactant I

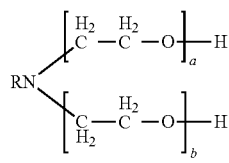
(14)

R = C$_{18}$H$_{37}$ a + b = 20

Re: Nonionic Surfactant Component

Nonionic Surfactant F

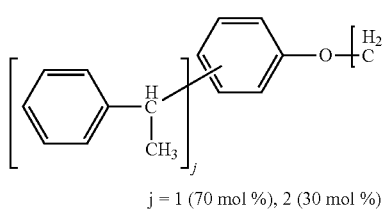
(12)

j = 1 (70 mol %), 2 (30 mol %)

Nonionic Surfactant J (15)

[structure with s]

s = 1 (70 mol %), 2 (30 mol %)

Nonionic Surfactant K (16)

[structure with t]

t = 1 (15 mol %), 2 (50 mol %), 3 (35 mol %)

Re: Anionic Surfactant Component

Anionic Surfactant G (13)

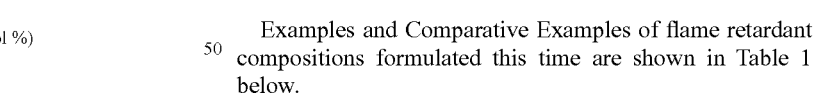

k = 1 (70 mol %), 2 (30 mol %)

Examples and Comparative Examples of flame retardant compositions formulated this time are shown in Table 1 below.

TABLE 1

| Raw material name | Ex. 1 | Ex. 2 | Ex. 3 | Ex. 4 | Ex. 5 | Ex. 6 | Ex. 7 | Ex. 8 | Ex. 9 | Ex. 10 | Ex. 11 | Comp. Ex. 1 | Comp. Ex. 2 |
|---|---|---|---|---|---|---|---|---|---|---|---|---|---|
| Phosphorus compound A | 30 | | | 15 | | | | | | | | | |
| Phosphorus compound B | | 30 | | 15 | 30 | 30 | 30 | | 30 | 30 | 30 | 30 | 30 |
| Phosphorus compound C | | | 30 | | | | | | | | | | |
| Phosphorus compound H | | | | | | | | 30 | | | | | |
| Cationic surfactant D | 0.5 | 0.5 | 0.5 | 0.5 | 0.2 | 1 | | 0.5 | | 0.5 | 0.5 | | |
| Cationic surfactant E | | | | | | | 0.5 | | | | | | |

TABLE 1-continued

| Raw material name | Ex. 1 | Ex. 2 | Ex. 3 | Ex. 4 | Ex. 5 | Ex. 6 | Ex. 7 | Ex. 8 | Ex. 9 | Ex. 10 | Ex. 11 | Comp. Ex. 1 | Comp. Ex. 2 |
|---|---|---|---|---|---|---|---|---|---|---|---|---|---|
| Cationic surfactant I | | | | | | | | | 0.5 | | | | |
| Nonionic surfactant F | 9 | 9 | 9 | 9 | 9 | 9 | 9 | 9 | 9 | | | 9 | 7.2 |
| Nonionic surfactant J | | | | | | | | | | 9 | | | |
| Nonionic surfactant K | | | | | | | | | | | 9 | | |
| Anionic surfactant G | | | | | | | | | | | | | 1.8 |
| Water | 60.5 | 60.5 | 60.5 | 60.5 | 60.8 | 60 | 60.5 | 60.5 | 60.5 | 60.5 | 60.5 | 61 | 61 |

Note:
Values in the table are each represented in mass % unit.

Subsequently, a fiber was treated with each of the flame retardant compositions formulated in Examples 1 to 11, and Comparative Examples 1 and 2, and the property by which a flame retardant component was adhered onto texture was evaluated.

It should be noted that when no nonionic surfactant was incorporated (Comparative Examples), no emulsion could be produced. Accordingly, a composition free of any nonionic surfactant could not be evaluated for its adhesion property.

Test for Adhesion Property onto Substrate

Test cloth: Polyester tropical (35 cm by 25 cm, about 20 g)
Test instrument: High-temperature and high-pressure dyeing tester (manufactured by Maeda Tekko Co., Ltd.)
Test conditions: First, a treatment liquid containing any one of the flame retardant compositions formulated in Examples 1 to 11, and Comparative Examples 1 and 2 was prepared (the flame retardant composition of the present invention was diluted with water by a factor of 160). Next, the entirety of the test cloth was immersed in the treatment liquid and subjected to a heat treatment at 130° C. for 30 minutes. The test cloth was removed, and the phosphorus content of the liquid before the heat treatment and that of the liquid after the heat treatment were measured (measurement method: ICP emission spectral analysis). What percentage of the phosphorus compound as a flame retardant component adhered onto the test cloth by the performance of the heat treatment (ratio of adhesion onto the test cloth) is calculated from the measured results. In addition, about 20 g of the liquid before the treatment and about 20 g of the liquid after the treatment are collected, and each of the liquids was dried at 105° C. for 3 hours. After that, each of the liquids was further dried in a desiccator for 1 hour and the amount of its evaporation residue was measured. A chemical consumption ratio, i.e., the ratio of the adhesion of the flame retardant composition onto the test cloth was calculated from the amounts of the evaporation residue of the liquid after the treatment and the evaporation residue of the liquid before the treatment.

The results of the evaluation performed by the method are shown in the FIGURE. Photographs of the liquid before the heat treatment and the liquid after the heat treatment are also shown in the FIGURE so that a change may be additionally easy to understand.

As a result, it was found that the flame retardant compositions of the present invention each containing a phosphorus compound and a cationic surfactant (Examples 1 to 11) showed higher ratios of adhesion of the flame retardant composition and the phosphorus compound as a flame retardant component onto the test cloth than those of the flame retardant composition using only a nonionic surfactant (Comparative Example 1), and the flame retardant composition using a nonionic surfactant and an anionic surfactant in combination (Comparative Example 2) as comparative examples. A liquid containing such a flame retardant composition where the ratios of the adhesion of the flame retardant composition and a phosphorus compound as a flame retardant component onto the test cloth were good became transparent after the treatment, and hence it could be visually confirmed that an effective component was adhered onto the test cloth. In addition, a cationic surfactant to be used is preferably a polyether group-containing cationic surfactant because a high adhesion ratio of a phosphorus compound is shown.

Further, a combustion test was performed by using the processed cloth under the following conditions.

Combustion Test

Test cloth: Test cloths treated with the flame retardant compositions of Examples 1 to 11, and Comparative Examples 1 and 2 (The corresponding cloths were defined as test cloths 1 to 13, respectively in the stated order.)
Test conditions: First, a test piece was produced by cutting each of the test cloths 1 to 13 into a square measuring 5 cm by 5 cm. Next, the test piece was ignited and the amount of the combustion residue of the test piece was visually evaluated.

Evaluation method: x: No combustion residue being present (flame retardancy is absent).
o: Part of the test piece remaining as a combustion residue (flame retardancy is present).

The results of the evaluation performed by the method are shown in Table 3.

TABLE 3

| | Test piece 1 | Test piece 2 | Test piece 3 | Test piece 4 | Test piece 5 | Test piece 6 | Test piece 7 | Test piece 8 | Test piece 9 | Test piece 10 | Test piece 11 | Test piece 12 | Test piece 13 |
|---|---|---|---|---|---|---|---|---|---|---|---|---|---|
| Flame retardant composition used | Ex. 1 | Ex. 2 | Ex. 3 | Ex. 4 | Ex. 5 | Ex. 6 | Ex. 7 | Ex. 8 | Ex. 9 | Ex. 10 | Ex. 11 | Comp. Ex. 1 | Comp. Ex. 2 |

TABLE 3-continued

| | Test piece 1 | Test piece 2 | Test piece 3 | Test piece 4 | Test piece 5 | Test piece 6 | Test piece 7 | Test piece 8 | Test piece 9 | Test piece 10 | Test piece 11 | Test piece 12 | Test piece 13 |
|---|---|---|---|---|---|---|---|---|---|---|---|---|---|
| Result of combustion test | o | o | o | o | o | o | o | o | o | o | o | x | x |

As a result, it was found that the flame retardant compositions of the present invention each containing a phosphorus compound and a cationic surfactant (Examples 1 to 11) each showed flame retardancy better than that at the time of use of each of the flame retardant composition using only a nonionic surfactant (Comparative Example 1), and the flame retardant composition using a nonionic surfactant and an anionic surfactant in combination (Comparative Example 2).

INDUSTRIAL APPLICABILITY

The applications of the flame retardant composition of the present invention are not limited to flame retardant fibers, and the composition can be widely used as a flame retardant for all sorts of materials such as electric appliances typified by household electric appliances, building material, materials to be used as household goods, plastic, rubber, paper, and various members for vehicles. Accordingly, the usability of the composition is extremely high.

The invention claimed is:

1. A flame retardant composition, comprising:
   at least one phosphorus compound of the following formula (1);
   a cationic surfactant comprising a polyether group-containing cationic surfactant, wherein the cationic surfactant comprises one or both of an amine of the following formula (6) and a quaternary ammonium salt of the following formula (8); and
   a nonionic surfactant comprising a nonionic surfactant having an aromatic ring in a molecule thereof:

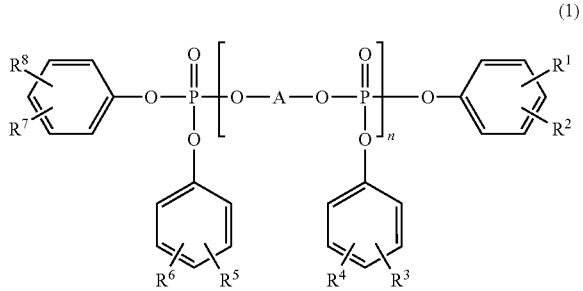
(1)

wherein A represents a divalent hydrocarbon group having 1 to 20 carbon atoms, n represents a number of from 1 to 10, and $R^1$ to $R^8$ each independently represent a hydrogen atom or an alkyl group having 1 to 20 carbon atoms;

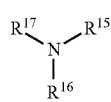
(6)

wherein $R^{15}$ to $R^{17}$ each independently represent a hydrocarbon group having 1 to 20 carbon atoms, a group represented by $-(G-O)_m-H$ where G represents an alkylene group having 2 carbon atoms and m represents a number of from 1 to 100, or a group that has 1 to 20 carbon atoms and has one or more substituents selected from the group consisting of an ester group, an amide group, and a hydroxyl group, provided that one or two groups represented by $-(G-O)_m-H$ are necessarily included;

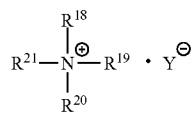
(8)

wherein $R^{18}$ to $R^{21}$ each independently represent a hydrocarbon group having 1 to 20 carbon atoms, a group represented by $-(L-O)_q-H$ where L represents an alkylene group having 2 to 4 carbon atoms and q represents a number of from 1 to 100, or a group that has 1 to 20 carbon atoms and has one or more substituents selected from the group consisting of an ester group, an amide group, and a hydroxyl group, and Y represents an anionic atom or an anionic group, provided that the compound of formula (8) contains at least one group represented by $-(L-O)_q-H$.

2. The flame retardant composition according to claim 1, further comprising water.

3. The flame retardant composition according to claim 2, wherein the flame retardant composition comprises 1 part by mass to 10 parts by mass of the cationic surfactant, 10 parts by mass to 60 parts by mass of the nonionic surfactant, and 150 parts by mass to 300 parts by mass of the water with respect to 100 parts by mass of the phosphorus compound.

4. A flame retardant fiber obtained by a treatment with the flame retardant composition of claim 1.

5. A method of increasing an amount of the phosphorus compound adhered onto a fiber, comprising treating the fiber with the flame retardant composition of claim 1.

6. A flame retardant fiber obtained by a treatment with the flame retardant composition of claim 2.

7. A method of increasing an amount of the phosphorus compound adhered onto a fiber, comprising treating the fiber with the flame retardant composition of claim 2.

8. A flame retardant fiber obtained by a treatment with the flame retardant composition of claim 3.

9. A method of increasing an amount of the phosphorus compound adhered onto a fiber, comprising treating the fiber with the flame retardant composition of claim 3.

* * * * *